(12) United States Patent
Würsching et al.

(10) Patent No.: US 7,710,039 B2
(45) Date of Patent: May 4, 2010

(54) COMPACT FLUORESCENT LAMP AND METHOD FOR MANUFACTURING

(75) Inventors: István Würsching, Budapest (HU); Ferenc Papp, Budapest (HU); József Fülöp, Budapest (HU); László Bánkuti, Budapest (HU)

(73) Assignee: General Electric Company, Schenectady, NY (US)

( * ) Notice: Subject to any disclaimer, the term of this patent is extended or adjusted under 35 U.S.C. 154(b) by 513 days.

(21) Appl. No.: 11/639,101

(22) Filed: Dec. 14, 2006

(65) Prior Publication Data

US 2008/0136330 A1 Jun. 12, 2008

(30) Foreign Application Priority Data

Oct. 24, 2006 (HU) .................................. 0600797

(51) Int. Cl.
*H01J 17/16* (2006.01)
(52) U.S. Cl. ................ 313/634; 313/623; 313/624; 313/625; 315/56; 445/26
(58) Field of Classification Search ......... 313/623–625, 313/634; 315/56; 445/26; 362/361–363; 439/226–244, 611–619
See application file for complete search history.

(56) References Cited

U.S. PATENT DOCUMENTS 4,272,703 A 6/1981 Eckberg
4,527,089 A 7/1985 Bouchard et al.

(Continued)

FOREIGN PATENT DOCUMENTS

DE 200 14 127 U 1 12/2001

(Continued)

OTHER PUBLICATIONS

EP 07 11 8684 Search Report, mailed Oct. 30, 2009.

*Primary Examiner*—Nimeshkumar D Patel
*Assistant Examiner*—Mary Ellen Bowman
(74) *Attorney, Agent, or Firm*—Fay Sharpe LLP

(57) ABSTRACT

A compact fluorescent lamp comprises a discharge tube arrangement with at least one discharge tube. The tube is formed of glass, encloses a discharge volume filled with a discharge gas and has a fluorescent phosphor coating disposed on the inner surface of the tube. The tube forms a continuous arc path and is provided with electrodes disposed at each end of the arc path. The lamp also comprises a ballast circuit connected to the electrodes by lead-in wires and to a supply voltage by lead-out wires for controlling the current in the tube. A bulb shaped outer envelope has a substantially spherical portion enclosing the tube arrangement and an elongated end portion enclosing the ballast circuit. The end portion of the outer envelope having an open end on a base side is closed and terminated by a closing means of the same material as the outer envelope. The closing means is provided with a tubular opening. The lead-out wires are isolated from each other and led through the tubular opening to a base for connecting said lamp to said supply voltage through a socket.

A method for manufacturing a compact fluorescent lamp as described above is also disclosed. In the proposed method, the open end of the elongated portion of the outer envelope is closed and terminated with a closing means comprising a tubular opening for leading through the lead-out wires.

10 Claims, 4 Drawing Sheets

U.S. PATENT DOCUMENTS

| | | |
|---|---|---|
| 4,600,856 A | 7/1986 | Bouchard et al. |
| 6,064,155 A * | 5/2000 | Maya et al. ............... 315/56 |
| 6,577,065 B2 * | 6/2003 | Kling ..................... 315/56 |
| 6,781,315 B2 * | 8/2004 | Nishio et al. ............. 315/56 |
| 2005/0184667 A1 | 8/2005 | Sturman et al. |

FOREIGN PATENT DOCUMENTS

| | | |
|---|---|---|
| EP | 0 122 107 A1 | 10/1984 |
| EP | 1 777 732 A2 | 4/2007 |

* cited by examiner

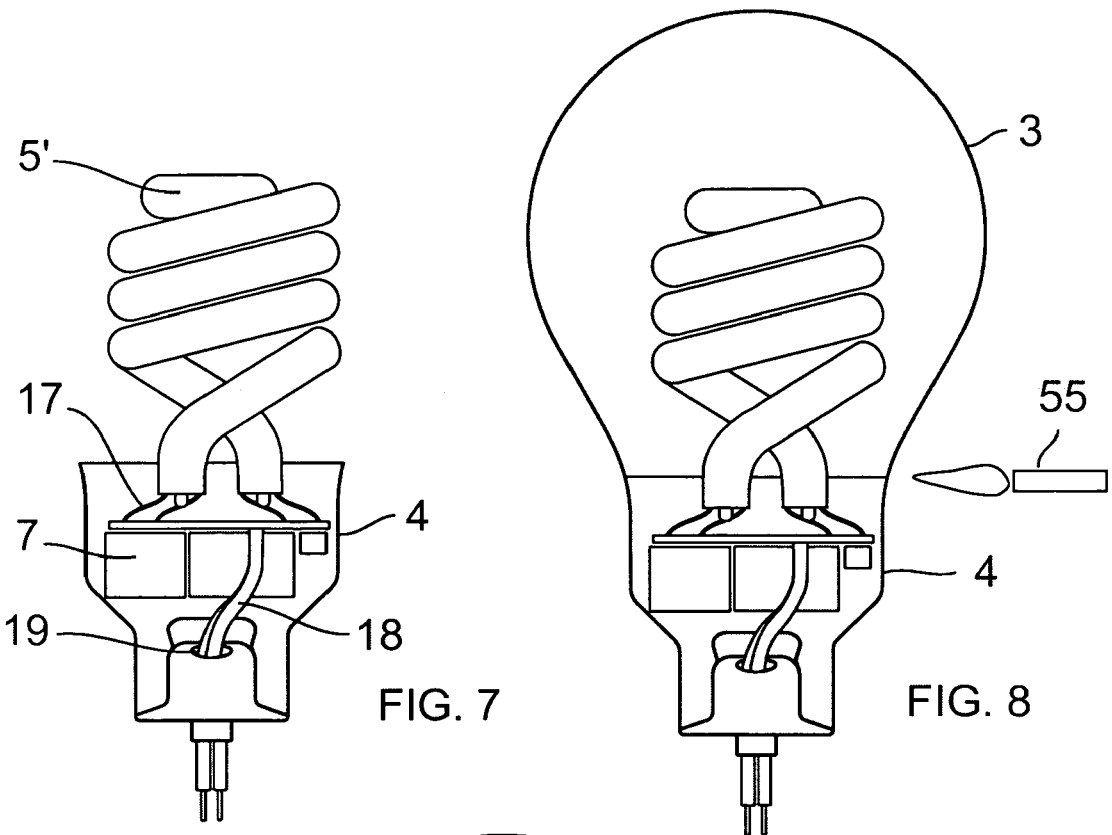
FIG. 7
FIG. 8
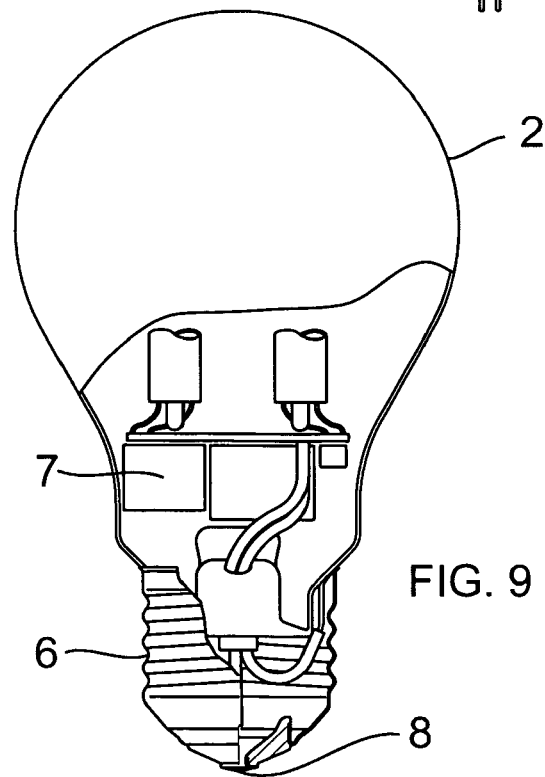
FIG. 9

COMPACT FLUORESCENT LAMP AND METHOD FOR MANUFACTURING

FIELD OF THE INVENTION

This invention relates to compact fluorescent lamps (CFL), and more particularly to compact fluorescent lamps that can replace incandescent lamps of general purpose. Even more specifically the invention relates to low-pressure compact fluorescent lamps that have an outer envelope and a ballast circuit within the outer envelope.

BACKGROUND OF THE INVENTION

The majority of the known and commercially available low-pressure discharge lamps are so-called compact fluorescent lamps at present. These lamps are determined to replace incandescent lamps used in a wide field of industry and home applications. Main advantages of these lamps are low power consumption and a long lifetime. Disadvantageous is however in CFL-s their relatively high price and large length dimension. Many configurations have been proposed to solve the length dimension problem. Such solutions include the multiple tube arrangements and the coiled tube arrangements.

U.S. Pat. No. 4,527,089 discloses a compact fluorescent lamp (CFL) comprising multiple, individual tubes mechanically formed into an assembly and inserted into an outer envelope. The individual open-ended tubes are connected to each other through an arc directing means to form a continuous arc path. The outer envelope has a cylindrical shape, is hermetically sealed and includes an arc generating and sustaining medium such as an atmosphere of mercury and argon. The electric wires of the fluorescent lamp as lead-in wires are lead through a flare that serves as a sealing element of the cylindrical outer envelope. The ballast circuit providing energy for the fluorescent lamp is situated outside the outer envelope and therefore it requires special contact elements and arrangement.

U.S. Pat. No. 4,600,856 describes a compact low pressure arc discharge lamp with multiple tubes frictionally fitted into apertures in a base plate. The base plate is held in a fixed position inside the sealed outer envelope but there is no built in ballast in the outer envelope or bulb. A CFL of such a construction has to be connected to outer ballast, which requires external electric connections and a special connection means to connect the ballast to a power supply.

U.S. Pat. No. 6,064,155 discloses a fluorescent lamp with an outer envelope having an external shape of an incandescent lamp on a standard Edison-type base. The discharge tube is wound in a coil around the axis of the envelope and is disposed within the outer envelope. Ballast is also disposed within the outer envelope. A heat shield is disposed between the lamp and the ballast to thermally isolate the lamp from the ballast, whereby heat from the lamp will not adversely affect the ballast. Although this lamp is provided with integrated ballast inside the outer envelope, serious difficulties may arise during production due to the use of the heat shield disposed between the lamp and the ballast. It is not disclosed and therefore it is not clear from this document how the lamp and the ballast circuit is positioned and fixed inside the outer envelope and how the electrical connection between the lamp electrodes and the ballast circuit or between the ballast circuit and the base is established.

Accordingly, there is a need for a compact fluorescent lamp with integrated ballast inside the outer envelope and an improved configuration in order to make the lamp easier to manufacture and therefore to provide a CFL that is cheaper.

There is also need for an improved method of production, which is easy to combine with the conventional manufacturing steps and therefore compatible with mass production. It is sought to provide a compact fluorescent lamp configuration, which readily supports different types of discharge tube configurations.

SUMMARY OF THE INVENTION

In an exemplary embodiment of the present invention, there is provided a compact fluorescent lamp comprising a discharge tube arrangement with at least one discharge tube. The tube is formed of glass, encloses a discharge volume filled with a discharge gas and has a fluorescent phosphor coating disposed on the inner surface of the tube. The tube forms a continuous arc path and is provided with electrodes disposed at each end of the arc path. The lamp also comprises a ballast circuit connected to the electrodes by lead-in wires and to a supply voltage by lead-out wires for controlling the current in the tube. A bulb shaped outer envelope has a substantially spherical portion enclosing the tube arrangement and an elongated end portion enclosing the ballast circuit. The end portion of the outer envelope having an open end on a base side is closed and terminated by a closing means of the same material as the outer envelope. The closing means is provided with a tubular opening. The lead-out wires are isolated from each other and led through the tubular opening to a base for connecting said lamp to said supply voltage through a socket.

In an exemplary embodiment of another aspect of the present invention, a method for manufacturing a compact fluorescent lamp is proposed. The method comprises the following steps: an outer envelope comprising a substantially spherical portion and an elongated end portion being terminated by an open end on a base side is provided. The open end of the elongated portion of the envelope is closed and terminated with a closing means of the same material as the material of the outer envelope. The closing means comprises a tubular opening. The envelope is separated into two parts by cutting along a circumferential line in a plane substantially perpendicular to the principal axis of the envelope. An upper part receives a discharge tube arrangement with lead-in wires and a lower part terminated by the closing means at a base side receives a ballast circuit with connection points for lead-out wires of the power supply and lead-in wires of the discharge tube arrangement. The lead-in wires of the discharge tube arrangement and the lead-out wires of the power supply are connected to the respective connection points of the ballast circuit, thereby providing a lamp ballast assembly. The ballast circuit part of the lamp ballast assembly is introduced into the lower part of the envelope and the lead-out wires are led through the tubular opening of the closing means. The two separated parts of the envelope are brought into contact with each other along the separating line. The upper and lower part of the envelope are connected and sealed along the separating line. The envelope is provided with a base and the lead-out wires are connected to contact terminals of the base.

The disclosed compact fluorescent lamps provide for a simplified structure of the CFL components as well as a simplified method of production thereof. By using a closing means with a tubular opening and leading the lead-out wires through this opening as suggested above, the consecutive manufacturing steps may be simplified, thereby providing better conditions for mass production. In the production of conventional incandescent lamps, a flare with an exhaust tube is used for closing, evacuating and filling the envelope and to establish a sealed closure of the envelope. The electrodes are sealed into the flare. In the compact fluorescent lamp disclosed, no sealed closure of the envelope is required and therefore the exhaust tube can be left open and used for leading through the lead-out wires. The use of a flare with an exhaust tube provides a possibility to make benefit of the production line used for manufacturing conventional incandescent lamps, which also reduces the cost of production especially when compared with other GLS (General Lighting Service) look alike lamps. Further advantage of this lamp is the full mechanical and electric compatibility with bulb-shaped incandescent lamps that makes it an efficient replacement lamp. The proposed lamps provide a certain level of protection against environmental load due to the outer envelope.

BRIEF DESCRIPTION OF THE DRAWINGS

The invention will now be described in more detail with reference to the enclosed drawing, in which FIG. 7 is a schematic diagram of inserting the lamp ballast assembly in the manufacturing of the lamp, FIG. 8 is a schematic diagram of connecting and sealing the two parts of the envelope in the manufacturing of the lamp, FIG. 9 is a schematic diagram of providing the closed end of the envelope with a base and contact terminals in the manufacturing of the lamp.

DETAILED DESCRIPTION OF THE INVENTION

Figure 1:
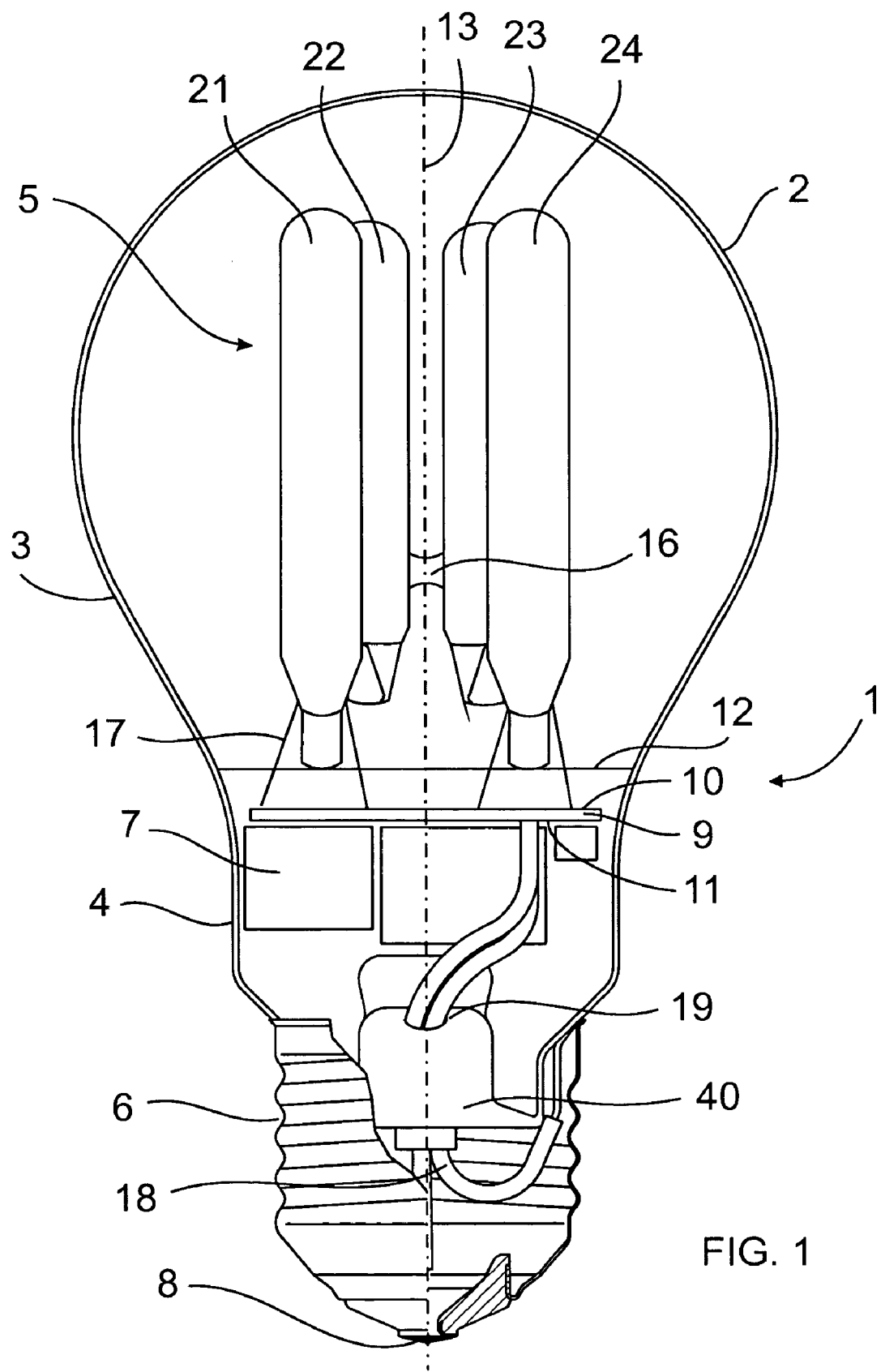
FIG. 1 is a side view, partially in cross section, showing an embodiment of the invention.

Referring first to FIG. 1, a low-pressure discharge lamp 1 is shown. The lamp is a fluorescent discharge lamp, with an outer envelope 2 enclosing a discharge tube arrangement 5 and a ballast circuit 7. The outer envelope 2 has a spherical part 3 and a longitudinal part 4 with an open ended neck portion connected to a base 6. The outer envelope is cut in two parts and separated at cutting line 12 in order that the ballast circuit 7 and the discharge tube arrangement 5 can be inserted and connected inside the outer envelope 2 as described in more detail below. The discharge tube arrangement 5 may comprise a single discharge tube or a plurality of elongated discharge tubes. The discharge tubes are made of glass, enclose a discharge volume filled with a discharge gas, and have a fluorescent phosphor coating disposed on the inner surface of the tubes. The ends of the tubes are sealed in a gas tight manner. The tubes are interconnected by bridges 16 and form a continuous arc path at the ends of which the tubes are provided with electrodes and lead-in wires 17 connected to the electrodes. The lead-in wires 17 of the discharge tube arrangement are connected to the ballast circuit 7 for controlling the current in the discharge tubes. The ballast circuit 7 is further connected to a supply voltage through lead-out wires 18 which are connected to contact terminals 8 in the lamp base 6. As shown in FIG. 1, the open end of the neck portion of the outer envelope 2 is closed and terminated by a closing means 40 of the same material as the outer envelope. The closing means 40 is provided with a tubular opening 19. The lead-out wires 18 are isolated from each other and led through the tubular opening 19 to the base 6 for connecting the lamp to the supply voltage through a socket. The lamp base is configured to be adapted to a socket, which may be of any conventional or standard type normally used for lamps. The lamp base may be configured to fit in a screw-type socket or a bayonet socket.

The ballast circuit 7 is mounted on a printed circuit board (PCB) 9, which has an assembling side 11 or surface facing toward said base 6, an upper side 10 or surface facing toward said discharge tube arrangement 5 and an edge portion following the shape of the outer envelope 2 to form a thermal isolating means. The edge portion of the printed circuit board 9 carrying the ballast circuit 7 has advantageously a circular boundary form according to the cross sectional configuration of the wall of the outer envelope 2 taken in cross direction to the principal axis 13 of the lamp 1. The PCB-s may also be accommodated vertically in the outer envelope.

The printed circuit board 9 carrying the ballast circuit 7 comprises terminals for connecting the lead-out wires 18 of the power supply and the lead-in wires 17 of the electrodes of the discharge tubes. The terminals for connecting the lead-out wires 18 of the power supply and for connecting the lead-in wires 17 of the electrodes of the discharge tubes are accessible from at least the upper side 10 of the printed circuit board facing the discharge tube arrangement 5.

The discharge tube arrangement 5 may be connected to fixing means (not shown) for fixing the position of the discharge tube arrangement 5 inside the outer envelope 2 in order to provide protection against mechanical vibration and shocks.

Figure 2:
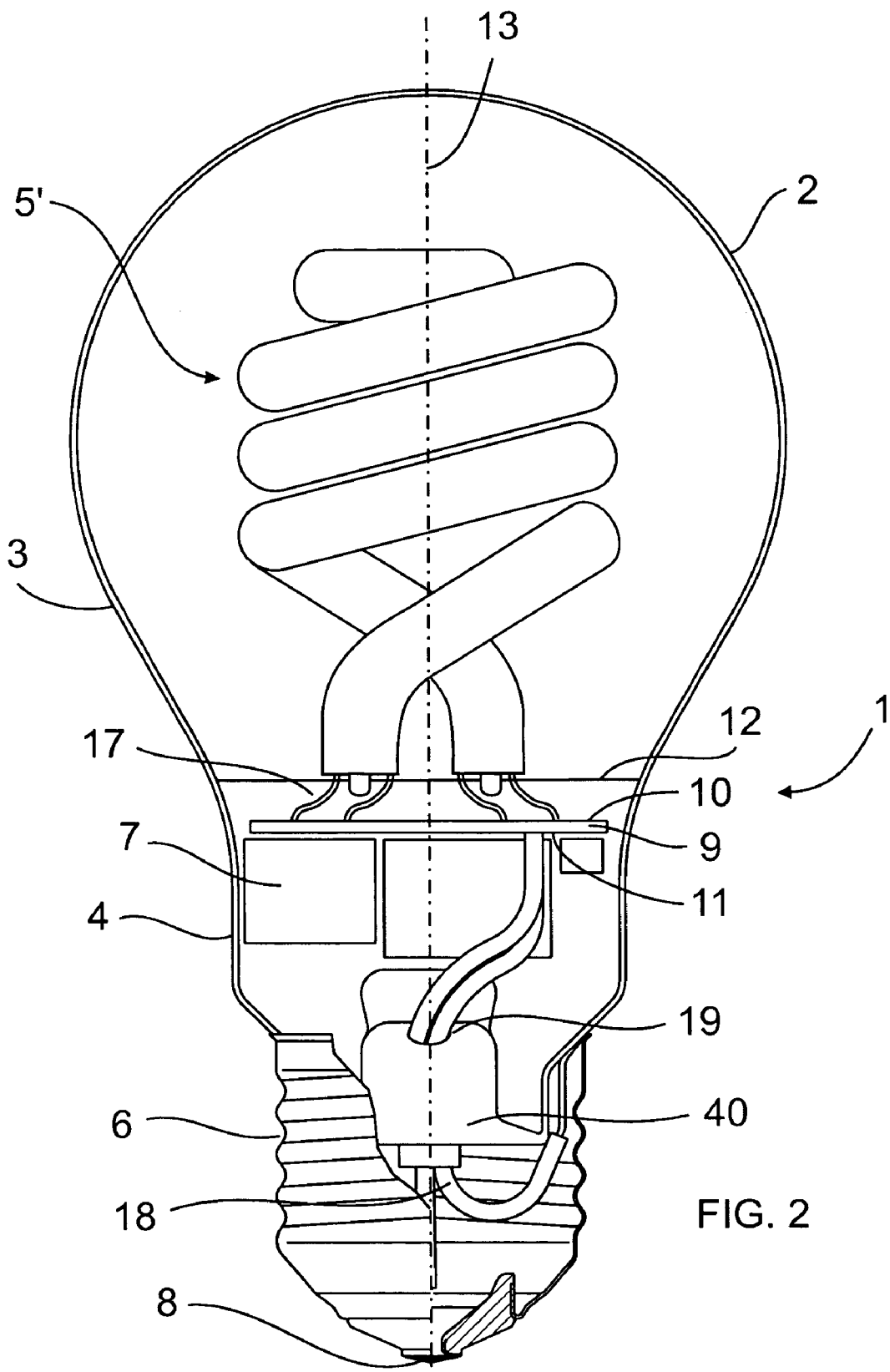
FIG. 2 is a side view, partially in cross section, showing another embodiment of the invention.

The difference between the embodiments shown in FIG. 1 and 2 is in the configuration of the discharge tube arrangement. In the embodiment shown in FIG. 1, the discharge tube arrangement 5 is comprised of straight tube members with a longitudinal axis substantially parallel to the principal axis 13 of the fluorescent lamp. The neighboring discharge tube members are connected to each other in series to form a continuous arc path, and arranged substantially at equal distance from the principal axis 13 of the fluorescent lamp and from each other to provide a substantially homogenous illumination. The outer envelope 2 is cut in two parts along a circumferential line in a plane substantially perpendicular to the principal axis 13 of the envelope to form an upper part 3 for receiving the discharge tube arrangement 5 with lead-in wires and a lower part 4 for receiving a ballast circuit 7 with connecting terminals for lead-out wires of the power supply and lead-in wires of the discharge tube arrangement 5.

In the embodiment shown in FIG. 2, the discharge tube arrangement 5' is comprised of a single tube with substantially straight end sections and an intermediate portion between the end sections. The end sections are at one end of the tube arrangement 5' and in proximity to each other and the intermediate portion has a coiled configuration wound about the principal axis 13 of the lamp 1 to provide a substantially homogenous illumination. The outer envelope 2 is cut in two parts along a circumferential line in a plane substantially perpendicular to the principal axis 13 of the envelope to form an upper part 3 for receiving the discharge tube arrangement 5' with lead-in wires and a lower part 4 for receiving a ballast circuit 7 with connecting terminals for lead-out wires 18 of the power supply and lead-in wires 17 of the discharge tube arrangement 5'. As shown in FIG. 2, the open end of the neck portion of the outer envelope 2 is closed and terminated by a closing means 40 of the same material as the outer envelope. The closing means 40 is provided with a tubular opening 19.

The lead-out wires 18 are isolated from each other and led through the tubular opening 19 to the base 6 for connecting the lamp to the supply voltage through a socket.

Referring again to FIG. 1, the first configuration of the discharge tube arrangement will be described in more detail that comprises substantially straight tube members. The discharge tube arrangement comprises four individual, elongated, substantially parallel straight discharge tube members 21 to 24 of substantially same length, which are interconnected by a bridge 16 to form a continuous arc path. The discharge tube arrangement is provided with electrodes and lead-in wires 17 connected to the electrodes at both ends of the arc path. Possible arrangements include also configurations with two or six individual discharge tube members depending on the required output luminous intensity. The discharge tube arrangement may also comprise two individual, elongated discharge tube members bent in an U-shape of substantially the same length, which are interconnected by a bridge to form a continuous arc path. Possible arrangements include also configurations with one or three individual discharge tubes bent in an U-shape depending on the required output luminous intensity. The U-shaped discharge tube members may comprise substantially parallel straight sections defining the length of the discharge tube arrangement and a curved middle section.

Each discharge tube encloses a discharge volume, which is filled with discharge gas. The discharge tubes are substantially tubular. In the shown embodiment, they are cylindrical, but other suitable cross sections may be selected as well. The discharge tubes are made of glass in the shown embodiments. It is preferred that the wall thickness of the discharge tubes should be substantially constant, mostly from a manufacturing point of view, and also to ensure an even discharge within the discharge tubes along their full length.

In order to provide visible light, the internal surface of the discharge tubes is covered with a fluorescent phosphor layer (not shown). This phosphor layer is within the sealed discharge volume. The composition of such a phosphor layer is known per se. This phosphor layer converts the UV radiation into visible light. The phosphor layer is applied to the inner surface of the discharge tubes before they are sealed.

Figure 3:
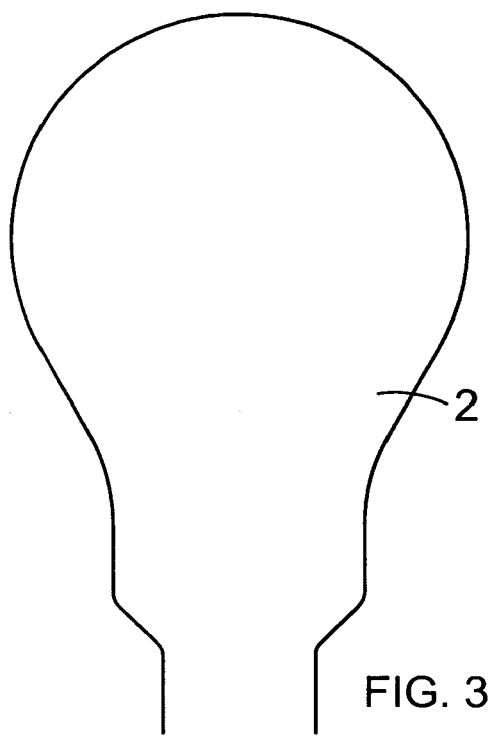
FIG. 3 is a schematic diagram of providing an outer envelope in the manufacturing of the lamp.
Figure 4:
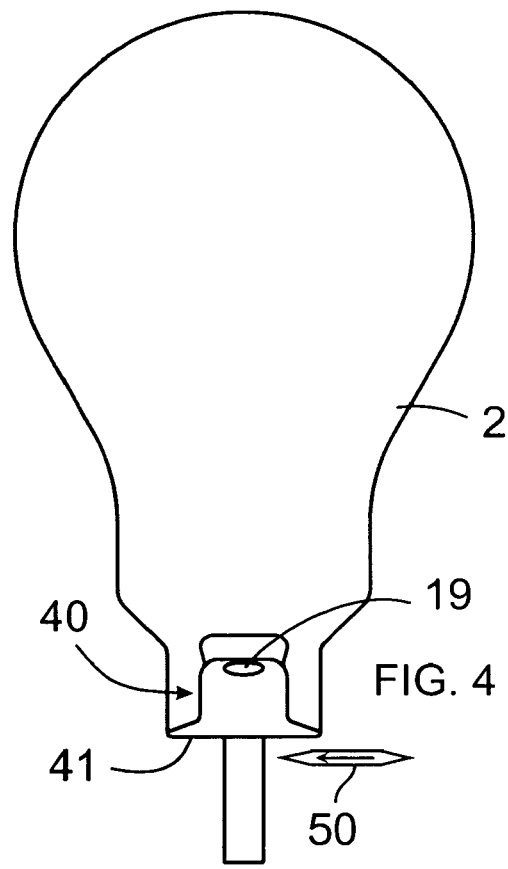
FIG. 4 is a schematic diagram of closing the outer envelope in the manufacturing of the lamp.

Referring now to FIGS. 3 to 9, the steps of producing a compact fluorescent lamp with an outer envelope having a closing means of an identical material with that of the outer envelope will be described in more detail. In step one, as depicted in FIG. 3, an outer envelope 2 with a substantially spherical portion and an elongated end portion is provided. The elongated end portion has an open end. In step two, as shown in FIG. 4, the open end of the elongated end portion is closed and terminated by a closing means 40 which is made of the same material as the envelope. The closing means 40 also comprises a tubular opening 19 for leading through the power or lead out wires connecting the ballast with the base. The closing means may be comprised of a flare with an exhaust tube used in conventional incandescent lamps. After connecting the closing means to the open end of the envelope, the tubular part of the exhaust tube is cut at a distance close to the flare portion 41 of the closing means 40 so as to provide the tubular opening. It is also possible that the length of the exhaust tube is selected to be in the required range during manufacturing and therefore need not be cut shorter. The exhaust tube also provides for a gas communication between the inside volume of the outer envelope and the outside atmosphere, which may be advantageous during operation when different gaseous products may be released within the outer envelope.

Figure 5:
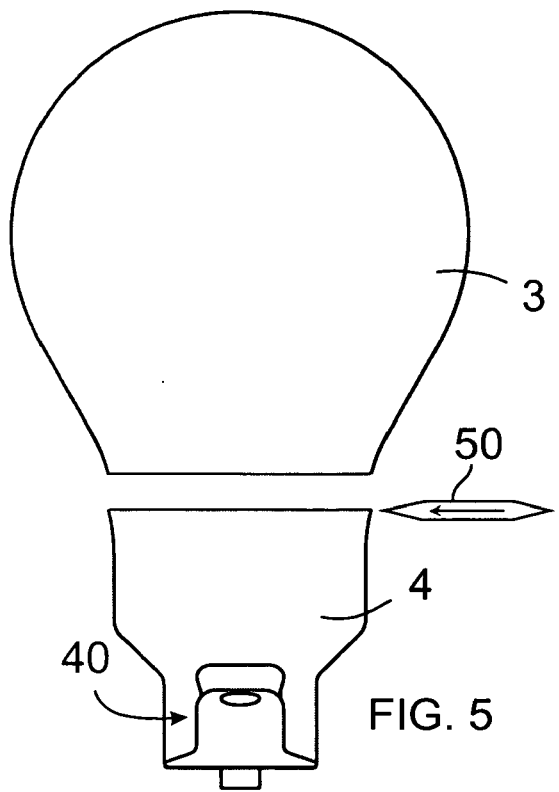
FIG. 5 is a schematic diagram of separating the outer envelope in the manufacturing of the lamp.
Figure 6:
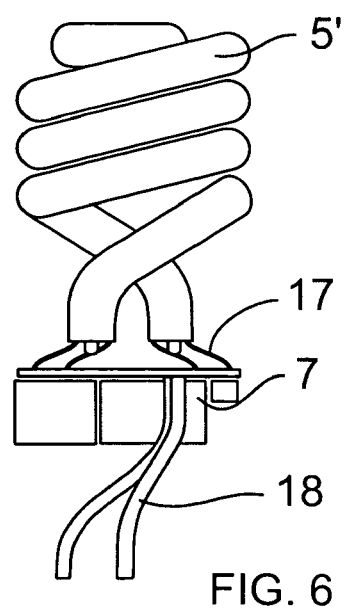
FIG. 6 is a schematic diagram of connecting the ballast circuit in the manufacturing of the lamp.

In a third step, as shown in FIG. 5, the outer envelope 2 is cut in two parts with a cutting dye 50. This may be preferably done by rotating the envelope around its principal axis while bringing it into a cutting position of the cutting dye, which is also rotating itself. The separation line created in this way has a circumferential or preferably circular form in a plane substantially perpendicular to the principal axis of the envelope. The upper part 3 is removed from the lower part 4, which lower part houses the closing means 40 also comprising the tubular opening 19.

In a fourth step (FIG. 6), the ballast circuit 7 is connected electrically with the discharge tube arrangement 5' by lead-in wires 17 and to lead-out wires 18 of the power supply and thereby providing a lamp-ballast assembly. One possible way of connecting the lead-in wires and the lead-out wires to the ballast is soldering the insulation free ends of the wires with corresponding connection or terminal points of the ballast circuit.

In a fifth step (FIG. 7), the lamp-ballast assembly is inserted into the lower part 4 of the outer envelope 2, which is already closed and terminated by the closing means comprising the tubular opening 19. While inserting the lamp-ballast assembly into the lower part of the outer envelope, the lead-out wires 18 are led through the tubular opening 19. In order to provide electrical insulation between the two lead-out wires, at least one of the wires has to be provided with an insulating layer. The base side end of the lead-out wire provided with an insulating layer has to be free in order to enable electrical contact with one of the contact terminals of the base. The position of the plane of the printed circuit board carrying the ballast circuit is selected as low as possible in proximity of the closing means 40 in order to keep the lead-out wires 18 as short as possible.

In a sixth step (FIG. 8), the upper part 3 of the outer envelope is rejoined and sealed with the lower part 4. In order to accomplish a solid mechanical connection or seal between the upper part 3 and the lower part 4 of the outer envelope, the two parts may be welded together using a heater 55, which may be a gas heater. The position of the circumferential separation line of the outer envelope has been selected in the region where the wall of the envelope has a substantially cylindrical form above the plane of the printed circuit board carrying the ballast circuit at a distance sufficient to protect the ballast circuit from the heat of the heater 55. The plane of the circumferential separation line and that of the printed circuit board carrying the ballast circuit are separated from each other by a security distance.

Finally, in a seventh step (FIG. 9), the fluorescent discharge lamp is completed with a base 6 for connecting the lamp to a conventional or standard socket of any screw-in or bayonet type. In the shown example as it can be seen in FIG. 9, the compact fluorescent lamp is provided with an Edison-type base. The lamp base may be fixed to the base side end of the elongated portion of the outer envelope in any conventional way. The base side end of the elongated portion of the outer envelope may be fixed to the base using an adhesive, cement or a threaded connection. When using a threaded connection the Edison-type base, it may be screwed onto the threaded end portion of the envelope. The electrical contacts of the lead-out wires of the power supply and the contact terminals 8 of the base are also created in this step.

The invention is not limited to the shown and disclosed embodiments, but other elements, improvements and variations are also within the scope of the invention. For example, it is clear for those skilled in the art that a number of other forms of the envelope 2 may be applicable for the purposes of the present invention, for example the envelope may have a triangular, square, pentagonal or hexagonal cross-section. The cross-section of the tubular discharge vessels need not be strictly circular either (as with a cylindrical discharge vessel), for example they may be triangular or rectangular, or simply quadrangular in general. The number of discharge tube members within a lamp 1 may also vary according to size or desired power output of the lamp.

The invention claimed is:

1. A compact fluorescent lamp comprising
   a discharge tube arrangement, said discharge tube arrangement being formed of at least one discharge tube made of glass, enclosing a discharge volume filled with a discharge gas, and having a fluorescent phosphor coating disposed on the inner surface of the tube, the tube forming a continuous arc path and further being provided with electrodes disposed at each end of the arc path;
   a ballast circuit for controlling current in the tube and being connected to the electrodes by lead-in wires and to a supply voltage by lead-out wires;
   a bulb-shaped outer envelope comprising a substantially spherical portion enclosing the discharge tube arrangement and an elongated end portion enclosing the ballast circuit;
   the end portion of the outer envelope having an open end on a base side;
   the open end being closed and terminated by a closing means of the same material as the outer envelope; and
   the closing means being provided with a tubular opening, in which the lead-out wires are isolated from each other and through which the lead-out wires are led in a non-sealing manner to a base for connecting said lamp to said supply voltage through a socket.

2. The compact fluorescent lamp of claim 1, in which the outer envelope and the closing means are made of glass.

3. The compact fluorescent lamp of claim 1, in which the closing means comprises
   a flare which is connected to the open end of the envelope, and
   an exhaust tube forming the tubular opening extending through the flare.

4. The compact fluorescent lamp of claim 1, in which the outer envelope is comprised of two parts separated along a circumferential line in a plane substantially perpendicular to the principal axis of the envelope, the two parts including an upper part for receiving the discharge tube arrangement and a lower part for receiving and the ballast circuit and the closing means, the two parts of the envelope being connectable and sealable to form a uniform bulb shaped envelope.

5. The compact fluorescent lamp of claim 1, in which the circumferential separation line of the outer envelope is in a region where the wall of the envelope has an elongated, substantially cylindrical form, and the ballast circuit is mounted on a printed circuit board, which is received in the lower part of the envelope and positioned in a plane substantially parallel to the separation plane at a distance from the separation plane sufficient for thermal protection during connecting and sealing the two parts.

6. The compact fluorescent lamp of claim 1, in which the discharge tube arrangement is comprised of straight tube members with a longitudinal axis substantially parallel to the principal axis of the fluorescent lamp and the neighboring tube members being connected to each other in series to form a continuous arc path, and the tube members being arranged substantially at equal distance from the principal axis of the fluorescent lamp and from each other to provide a substantially homogenous illumination.

7. The compact fluorescent lamp of claim 1, in which the discharge tube arrangement is comprised of a single tube with substantially straight end sections and an intermediate portion between the end sections and the end sections being at one end of the tube arrangement and in proximity to each other and the intermediate portion having a coiled configuration wound about the principal axis of the lamp to provide a substantially homogenous illumination.

8. A method for manufacturing a compact fluorescent lamp comprising the steps of:
   a) providing an outer envelope comprising a substantially spherical portion and an elongated end portion being terminated by an open end on a base side;
   b) closing and terminating the open end of the elongated portion of the envelope with a closing means of the same material as the material of the outer envelope, the closing means also comprising a tubular opening;
   c) separating the envelope by cutting along a circumferential line in a plane substantially perpendicular to the principal axis of the envelope into an upper part for receiving a discharge tube arrangement with lead-in wires and a lower part terminated by the closing means at the base side for receiving a ballast circuit with connecting terminals for lead-out wires of the power supply and lead-in wires of the discharge tube arrangement;
   d) connecting the lead-in wires of the discharge tube arrangement and the lead-out wires of the power supply to the respective connection points of the ballast circuit, thereby providing a lamp ballast assembly;
   e) introducing the ballast circuit part of the lamp ballast assembly into the lower part of the envelope and leading the lead-out wires through the tubular opening of the closing means in a non-sealing manner;
   f) bringing the separated upper part and lower part of the envelope along the separating line into contact with each other;
   g) connecting and sealing the upper and lower part of the envelope along the separating line;
   h) providing the envelope with a base; and
   i) connecting the lead-out wires to contact terminals of the base.

9. The compact fluorescent lamp of claim 1 wherein the bulb-shaped envelope substantially spherical portion is an upper portion and the elongated end portion is substantially cylindrical.

10. The method of claim 8 wherein the separating step occurs along an elongated substantially cylindrical portion of the end portion.

* * * * *